US012699622B2

(12) United States Patent (10) Patent No.: US 12,699,622 B2
Kamazuka et al. (45) Date of Patent: Aug. 4, 2026

(54) DATA PROCESSING SYSTEM AND DATA PROCESSING METHOD

(71) Applicant: Hitachi, Ltd., Tokyo (JP)

(72) Inventors: Tomoyuki Kamazuka, Tokyo (JP); Ryota Tatsuuma, Yokohama (JP); Shoji Kato, Yokohama (JP); Yuusaku Kiyota, Tokyo (JP)

(73) Assignee: HITACHI VANTARA, LTD., Yokohama (JP)

( * ) Notice: Subject to any disclaimer, the term of this patent is extended or adjusted under 35 U.S.C. 154(b) by 167 days.

(21) Appl. No.: 18/599,302

(22) Filed: Mar. 8, 2024

(65) Prior Publication Data

US 2025/0077339 A1 Mar. 6, 2025

(30) Foreign Application Priority Data

Jun. 16, 2023 (JP) ................................. 2023-099670

(51) Int. Cl.
*G06F 11/00* (2006.01)
*G06F 11/07* (2006.01)
(52) U.S. Cl.
CPC ...... *G06F 11/0793* (2013.01); *G06F 11/0721* (2013.01)
(58) Field of Classification Search
CPC ............. G06F 11/0793; G06F 11/0721; G06F 11/1024; G06F 11/1048
See application file for complete search history.

(56) References Cited

FOREIGN PATENT DOCUMENTS

| JP | 2006-053873 A | 2/2006 |
| JP | 2014-178793 | 9/2014 |
| JP | 2014178793 A | * 9/2014 |
| JP | 2015-201814 A | 11/2015 |

OTHER PUBLICATIONS

Japanese Office Action received in corresponding Japanese Application No. 2023-099670 dated Jan. 21, 2025.

* cited by examiner

*Primary Examiner* — Katherine Lin
(74) *Attorney, Agent, or Firm* — MATTINGLY & MALUR, PC

(57) ABSTRACT

A data processing system includes: a processor implemented by a programmable device; and a processor processing unit connected to the processor. The processor includes a plurality of processing circuits configured to execute in parallel data processing commands provided from the processor processing unit, an error detection circuit configured to detect a soft error occurring in a processing circuit that is executing the data processing command, and a processing circuit selection unit configured to select a processing circuit to execute the data processing command from a plurality of processing circuits. The processing circuit selection unit specifies a processing circuit in which the soft error occurs based on a soft error detection result of the error detection circuit, and selects a processing circuit to execute the data processing command from the plurality of processing circuits, excluding the processing circuit in which the soft error occurs.

5 Claims, 9 Drawing Sheets

| #DMAC NUMBER ~111 | #IP NUMBER ~112 | ERROR OCCURRENCE COUNT ~113 | ERROR COUNT THRESHOLD ~115 |
|---|---|---|---|
| #1 | #1 | 2 | 2 |
|  | #2 | 0 | 2 |
|  | #3 | 0 | 2 |
|  | #N | 0 | 2 |
| ... | ... | ... |  |
| #M | #1 | 0 | 2 |
|  | #2 | 0 | 2 |
|  | #3 | 1 | 2 |
|  | #N | 0 | 2 |

| #DMAC NUMBER ~121 | All IPS ARE Busy ~122 | COMMAND RECEIVABLE ~123 |
|---|---|---|
| #1 | 1 | No |
| #2 | 0 | Yes |
| ... | ... | ... |
| #M | 0 | No |

FIG. 11

| #IP NUMBER | IN PROCESSING | CYCLIC CORRECTION ON STANDBY | ARBITER PARTICIPATION UNAVAILABLE | COMMAND RECEIVABLE |
|---|---|---|---|---|
| #1 | 0 | 0 | 1 | No |
| #2 | 0 | 0 | 0 | Yes |
| #3 | 1 | 0 | 0 | No |
| ... | ... | ... | | ... |
| #N | 0 | 1 | 0 | No |

DATA PROCESSING SYSTEM AND DATA PROCESSING METHOD

CROSS-REFERENCE TO RELATED APPLICATION

The present application claims priority from Japanese application JP2023-099670, filed on Jun. 16, 2023, the content of which is hereby: incorporated by reference into this application.

BACKGROUND OF THE INVENTION

1. Field of the Invention

The present invention relates to a data processing system and a data processing method.

2. Description of Related Art

Provided is a functional device, a function maintaining method, and a function maintaining capable of program maintaining a function continuously in relation to a functional device that performs a required function by programming, such as a field-programmable gate array (FPGA). The functional device includes a plurality of functional units, and maintains a function by switching a functional unit in which a failure occurs to a standby functional unit. The plurality of functional units, a failure detection unit, and a switching unit are provided, and an operating functional unit and a standby functional unit are set. That is, the functional unit in which the failure occurs is set to be on standby, and a functional unit on standby is operated. Accordingly, an invention is disclosed in which a continuous function can be maintained without stopping an operation of a system due to a failure occurring in the functional unit, and reliability of the system can be improved by maintaining the function.

CITATION LIST

Patent Literature

PTL 1: JP2006-53873A

SUMMARY OF THE INVENTION

Due to a structure of the FPGA, a soft error may occur in which bit inversion occurs in data written in a configuration memory (hereinafter, CRAM) by radiation such as a neutral line or an $\alpha$ line. When a soft error occurs in the FPGA, a circuit configuration changes. Therefore, the FPGA in which the soft error occurs causes the device to malfunction or outputs an erroneous calculation result until the inverted bit is corrected. Since an output of the FPGA during the occurrence of the soft error is not reliable, an error correction and retry of commands before and after the occurrence of the error are required.

When an FPGA is incorporated into a mission critical system, there is a method in which a spare processing circuit (spare system) is prepared in addition to a processing circuit that normally operates to provide resistance to a failure caused by the soft error. In this method, it is necessary to mount an inactive backup system, and there is a problem that circuit resources of the FPGA are consumed in order to mount the backup system that does not operate in the normal processing.

An object of the invention is to provide a data processing system including a processor implemented by a programmable device; and a processor processing unit connected to the processor. The processor includes a plurality of processing circuits configured to execute in parallel data processing commands provided from the processor processing unit, an error detection circuit configured to detect a soft error occurring in a processing circuit that is executing the data processing command, and a processing circuit selection unit configured to select a processing circuit to execute the data processing command from the plurality of processing circuits. The processing circuit selection unit specifies a processing circuit in which the soft error occurs based on a soft error detection result of the error detection circuit, and selects a processing circuit to execute the data processing command from the plurality of processing circuits, excluding the processing circuit in which the soft error occurs.

According to the invention, it is possible to implement a redundant data processing system that effectively utilizes a capacity of a semiconductor.

The problems, configurations, and effects other than those described above will become apparent in the following description of the embodiment.

BRIEF DESCRIPTION OF THE DRAWINGS

FIG. 5 shows an example of a command process according to the embodiment of the invention;

FIG. 9 shows an example of an IP error count management table according to the embodiment of the invention;

FIG. 10 shows an example of a DMAC management table according to the embodiment of the invention; and FIG. 11 shows an example of an IP management table according to the embodiment of the invention.

DESCRIPTION OF EMBODIMENTS

Figure 1:
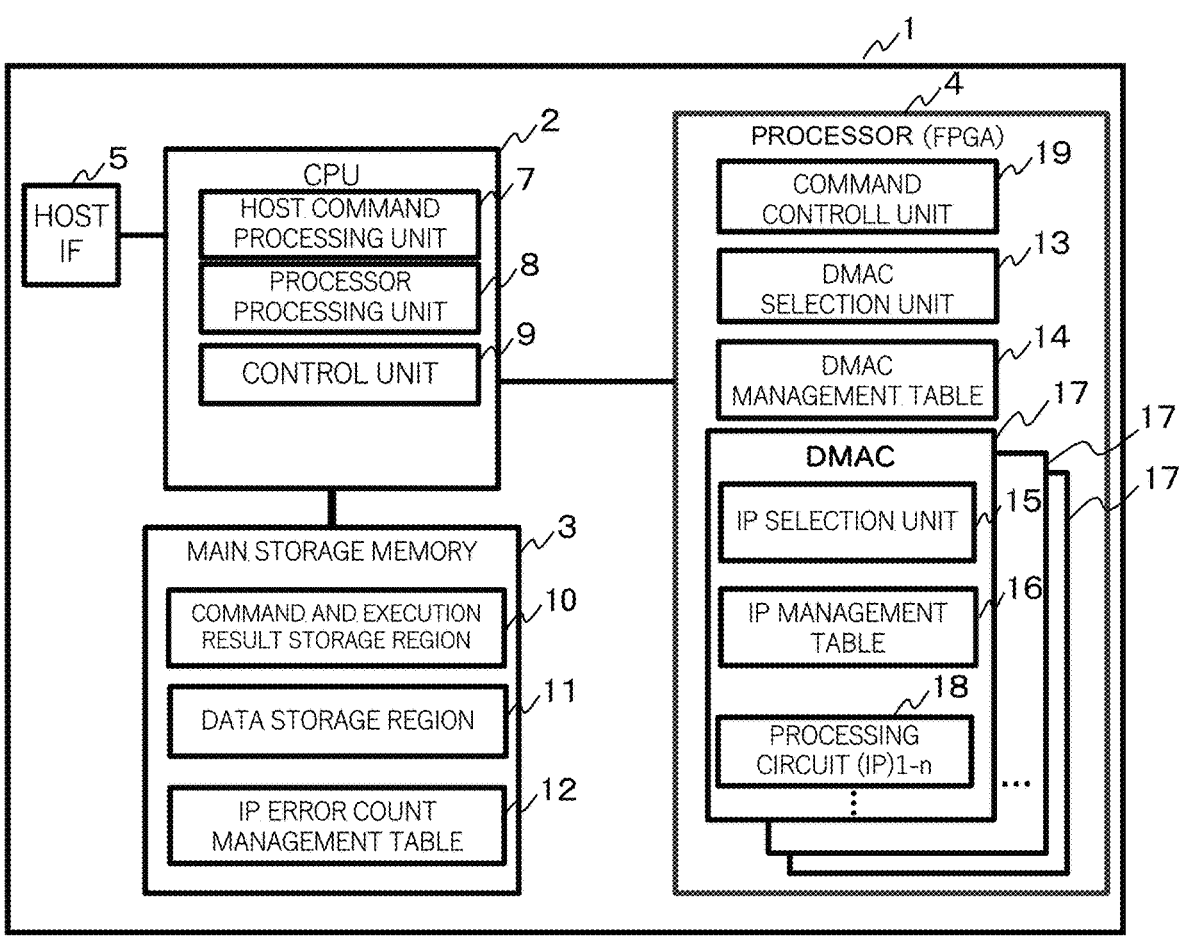
FIG. 1 shows an example of a system configuration diagram according to an embodiment of the invention.

Hereinafter, an embodiment according to the invention will be described with reference to the drawings. In the drawings showing the embodiment, the same components are denoted by the same names and reference signs, and repeated description thereof is omitted.

The invention is not limited to the embodiment to be described later, and includes various modifications and equivalent configurations within the spirit of the appended claims. For example, the above-described embodiment is described in detail for easy understanding of the invention, and the invention is not necessarily limited to those including all the configurations described above.

A part or all of processing units described in the embodiment may be implemented by hardware by, for example, designing an integrated circuit, or may be implemented by software by a processor interpreting and executing a program for implementing each function.

Tables, regions, and the like described in the embodiment may be a database (DB) or data stored in a main storage memory.

First Embodiment

FIG. 1 is an example of a system configuration diagram according to an embodiment of the invention. A data processing system 1 includes a central processing unit (CPU) 2, a main storage memory 3, a processor (field-programmable gate array (FPGA)) 4, and a host interface (IF) 5. The CPU 2 and the processor 4 share a data bus for the main storage memory 3, and each access data to the main storage memory 3 through the data bus.

The CPU 2 includes a host command processing unit 7 that receives a processing request of a host from the host IF 5 and analyzes a command included in the request, a processor processing unit 8 that performs a communication process of the command and a processing result of the command with the processor 4, and a control unit 9 that controls the command process in the system 1.

These control units and processing units may be stored in the main storage memory 3 and executed by the CPU 2, or may be implemented by hardware.

The processor 4 includes one or a plurality of direct memory access controllers (DMACs) 17, a DMAC selection unit 13 that selects the DMAC 17 that executes a DMA command process, a DMAC management table 14 that stores status information of the DMACs, and the like, and a command control unit 19 that transmits and receives a DMA command between the CPU 2 and the DMAC selection unit 13. Each DMAC 17 stores a plurality of processing circuits 18 that execute a data process based on a DMA command, and further includes an IP selection unit 15 that selects the processing circuit and an IP management table 16 that stores status information of the processing circuit, and the like.

The DMAC 17 selected by the DMAC selection unit 13 executes DMA with the main storage memory 3 when executing the data process based on the DMA command. That is, reading a command and storing a command execution result are directly performed between a command and execution result storage region 10 of the main storage memory 3, and reading command processing data and storing processed data are directly performed between a data storage region 11 of the main storage memory 3.

In the present embodiment, when only one DMAC 17 is mounted on the processor 4, the DMAC selection unit 13 is not necessarily required.

The main storage memory 3 includes the command and execution result storage region 10 for storing details of the DMA command and the execution result thereof, the data storage region 11 for storing data before and after the processing circuit processes the DMA command, and an IP error count management table 12 for managing an error count of the processing circuit.

The CPU 2 and the processor 4 are connected by a peripheral component interconnect express (PCIe) interface, or the like. Alternatively, another communication protocol may be used for the connection.

Figure 2:
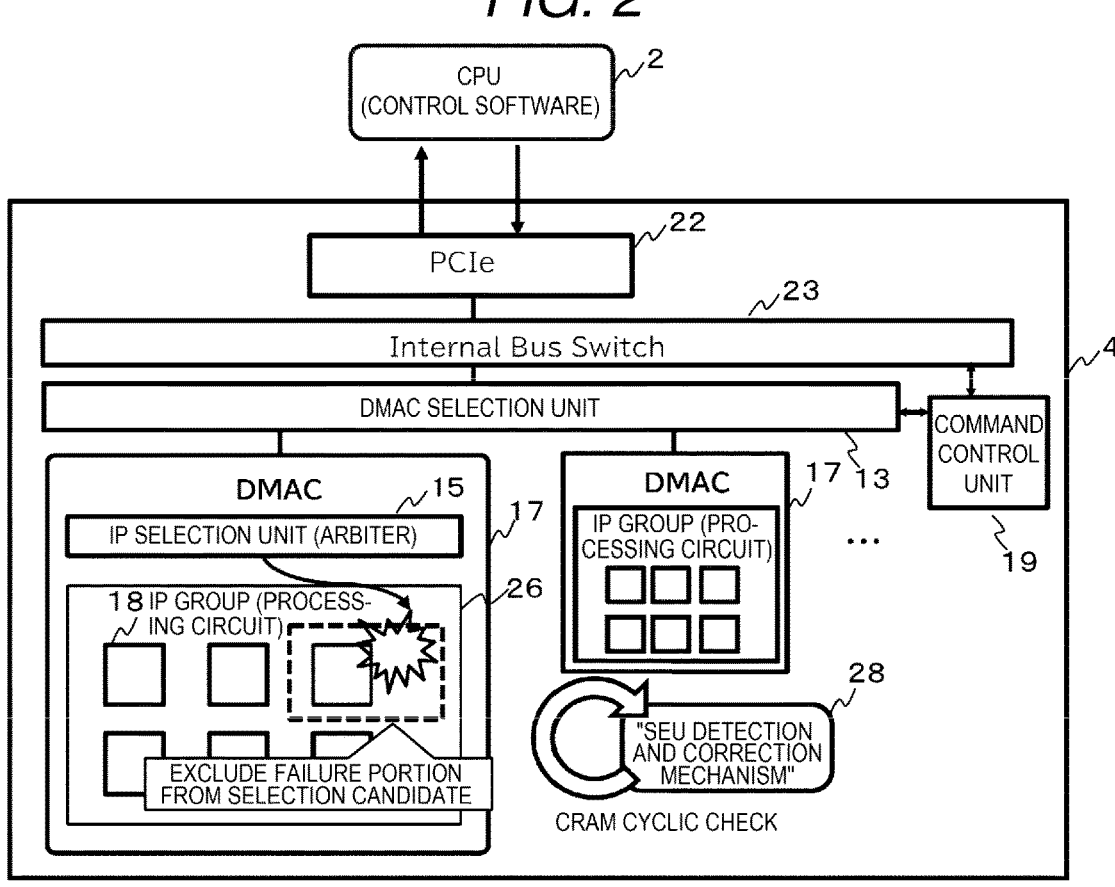
FIG. 2 shows an example of a hardware configuration of a processor according to the embodiment of the invention.

FIG. 2 shows an example of a hardware configuration of the processor according to the embodiment of the invention.

The CPU 2 is connected to the processor 4. In this example, a PCIe 22 and an internal bus switch 23 are mounted on the processor and connected to the DMAC selection unit 13. The DMAC selection unit 13 is connected to the plurality of DMACs 17, and the DMAC 17 includes an IP group (processing circuit group) 26 on which the plurality of processing circuits 18 are mounted. As will be described later with reference to FIG. 4, the processing circuits 18 are provided in corresponding IP control units, and are shown in a simplified manner in FIGS. 1 to 3 for the description of functions.

The IP selection unit 15 (arbiter) selects the processing circuit 18 that executes the DMA command among these processing circuits.

A single event upset (SEU) detection and correction mechanism 28 performs an error correction of the processing circuit 18. Specifically, the SEU detection and correction mechanism 28 periodically performs a cyclic check of a CRAM (not shown) in which a circuit configuration of the FPGA provided in the processor 4 is stored, and performs the error correction when an error of the processing circuit 18 is detected.

Figure 3:
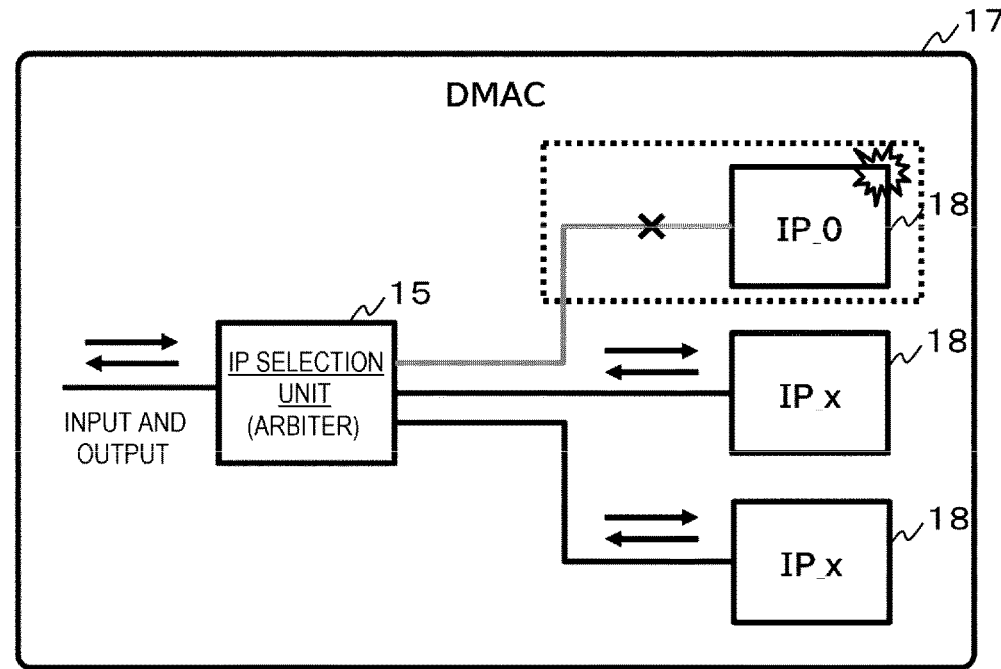
FIG. 3 shows an example of a DMAC according to the embodiment of the invention.

FIG. 3 shows an example of the DMAC according to the embodiment of the invention. Here, the following description assumes that one DMAC 17 that executes the DMA command is selected by the DMAC selection unit 13.

Based on the DMA command, the DMAC 17 selected by the DMAC selection unit 13 reads information related to the DMA command from the command and execution result storage region 10 of the main storage memory 3 by DMA transfer, and reads the processing data from the data storage region 11 based on the acquired DMA command.

The IP selection unit 15 in the selected DMAC 17 receives the DMA command and the processing data, and transmits the DMA command and the processing data to the selected processing circuit 18 as a data processing target. In FIG. 3, it is assumed that a processing circuit IPO is selected from the processing circuits 18. The selected processing circuit IPO executes the DMA command and outputs the command execution result and the processed data. The selected DMAC 17 stores s the command execution result and the processed data in the command and execution result storage region 10 and the data storage region 11, respectively, by the DMA.

When an error occurs during the command process performed by the selected processing circuit IPO, the selected processing circuit IPO is excluded from a selection target, and another processing circuit as a selection target candidate is selected to continue the command process.

Figure 4:
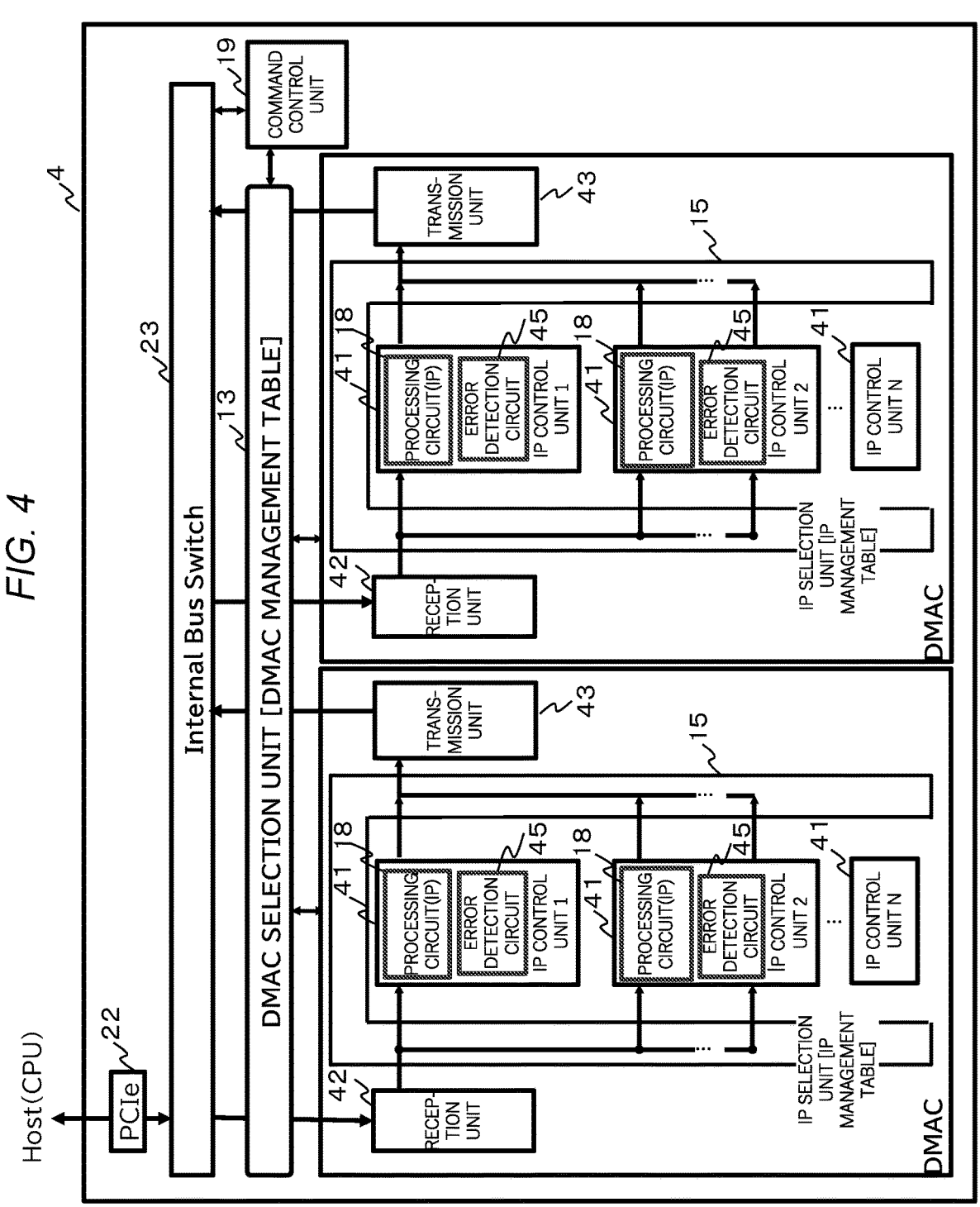
FIG. 4 shows an example of a detailed configuration of the processor according to the embodiment of the invention.

FIG. 4 shows an example of a detailed configuration of the processor 4 according to the embodiment of the invention. The DMAC 17 includes a reception unit 42 that receives the DMA command from the DMAC selection unit 13, a transmission unit 43 that transmits the processing result of the processing circuit 18 to the DMAC selection unit 13, and the IP selection unit 15 that selects and outputs the processing circuit 18 that executes the DMA command.

Each IP control unit 41 includes the processing circuit 18 and an error detection circuit 45 that detects a soft error occurring in the processing circuit 18. The error detection circuit 45 detects the occurrence of the soft error by detecting a change in a circuit configuration of the processing circuit 18. A method for detecting a change in the circuit configuration includes (1) adding an error correction code to a transmission path inside the processing circuit, (2) immediately decompressing compressed data, and collating the obtained result with original data (when the processing circuit 18 corresponds to compression and decompression of data), and (3) verifying a previously added error detection code at the time of decoding data (when the processing circuit 18 corresponds to encryption and decryption of data). Alternatively, other methods may be adopted.

Next, tables used in the present embodiment will be described with reference to FIGS. 9 to 11.

FIG. 9 shows an example of the IP error count management table 12 according to the embodiment of the invention. The IP error count management table 12 is stored in the main storage memory 3, and includes a column 111 of a #DMAC number for identifying each DMAC, a column 112 of an #IP number for identifying each processing circuit in the DMAC, a column 113 of an error occurrence count in a processing circuit corresponding to the #IP number, and a column 115 of an error count threshold in a processing circuit corresponding to the #IP number.

The IP error count management table 12 is referred to by the control unit 19 of the CPU 2, and the error occurrence count 113 is stored for each processing circuit 18 provided in the DMAC. Then, when the error occurrence count 113 reaches a predetermined count, a column 134 of arbiter participation unavailable in the IP management table 16 to be described later is set to 1 (ON), which is used for excluding the processing circuit 18 from the selection targets.

FIG. 10 shows an example of the DMAC management table 14 according to the embodiment of the invention. The DMAC management table 14 is stored in the processor 4, and includes a column 121 of the #DMAC number, a column 122 of Busy indicating whether all processing circuits belonging to the DMAC corresponding to the #DMAC number are in processing, and a column 123 of command receivable indicating whether the DMAC corresponding to the #DMAC number can receive a command.

When the system includes a plurality of DMACs, the DMAC selection unit 13 manages usage of the DMACs using the present table. When all the processing circuits 18 provided in the DMAC are in processing, all the processing circuits 18 set the column 122 of Busy to ON (1), so that the DMAC is not selected. In this example, when all the processing circuits 18 are in processing, the column 123 of command receivable is set to No, so that the DMAC is not selected.

A column for registering the number of processing circuits 18 held by the DMAC and the number of processing circuits 18 in processing may be provided, the number of processing circuits 18 in processing may be increased by 1 when the DMAC selection unit selects the DMAC, a usage rate of the processing circuits 18 in the DMAC may be obtained by decreasing the number of processing circuits 18 in processing by 1 when the processing of the processing circuits 18 is completed, and the DMAC having a low usage rate may be selected.

In addition, when a data processing amount for each process requested by the host is greatly different, instead of counting the number of processes, a column for counting an amount of the processed data may be provided, and the DMAC to be used may be selected based on the data processing amount.

In addition, the system can be efficiently operated if load information indicating that a proportion of the used processing circuits 18 among the processing circuits 18 held by the DMAC is high, performance information indicating a processing speed of the DMAC, and the like are provided, and the DMAC having a high use priority and a DMAC having a low use priority can be recognized.

Further, different types of processing circuits 18 may be provided for each DMAC, and the DMAC may be selected according to a process requested by the host.

FIG. 11 shows an example of the IP management table 16 according to the embodiment of the invention. The IP management table 16 is provided for each DMAC, and includes a column 132 of in processing indicating whether each processing circuit 18 in the DMAC is in processing, a column 133 of cyclic correction on standby indicating whether a cyclic correction is on standby, a column 134 of arbiter participation unavailable indicating that the process cannot be performed, and a column 135 of command receivable indicating whether a command can be received.

If all the columns 132 to 134 are OFF (0), the column of command receivable is set to Yes, which indicates that the processing circuit 18 can perform the process. In addition, by storing information such as a type and a version of the processing circuit 18, the usable processing circuits 18 and the processing circuits 18 having a high use priority can be expressed.

Next, command process operations in the system according to the present embodiment will be described with reference to FIG. 5.

The host command processing unit 7 of the CPU 2 receives the processing request from the host, analyzes a host command included in the request, and transfers an analysis result to the control unit 9. The host command is a command for reading or writing designated data for a logical storage region that is provided by the system 1 and that can be referred to by the host, and the storage region is set in association with the main storage memory 3.

The control unit 9 specifies a command (hereinafter, DMA command) of the DMA involving the data process with the processor 4 and data (hereinafter, processing target data) to be processed of the DMA command that correspond to the received host command, and stores the DMA command in the command and execution result storage region 10 of the main storage memory 3 and the processing target data in the data storage region 11.

Examples of the command according to the DMA command include "read plain text from the address XX (of the main storage memory 3), and write compressed data to the address XX" and "read compressed data from the address XX (of the main storage memory 3), decompress the compressed data, and write the decompressed data to the address XX". In the present embodiment, an address of the processing target data designated by the DMA command is directly used as an address of the data storage region 11. With such a configuration, the address of the data storage region 11 in which the processing target data is stored can be specified by accessing an address of the command and execution result storage region 10 in which the DMA command is stored and referring to the DMA command.

Thereafter, the processor processing unit 8 transmits a command reception notification including an address of the DMA command stored in the command and execution result storage region 10 to the processor 4 (S50). The command reception notification may not include the address of the DMA command. In this case, the address of the command and execution result storage region 10 in which the DMA command is stored may be determined in advance in the system 1, and the command control unit 19 that receives the command reception notification in the processor 4 may access the address and read the DMA command.

The processor 4 transmits the command reception notification to the command control unit 19 via the PCIe 22 and the internal bus switch 23. The command control unit 19 reads, from the main storage memory 3, the DMA commands based on the address of the command and execution result storage region 10 included in the notification and the processing target data based on the DMA command, and transmits the DMA commands and the processing target data to the DMAC selection unit 13. The DMAC selection unit 13 that receives the DMA command and the processing target data refers to the column 123 of command receivable of the DMAC management table 14 and determines whether there is the DMAC 17 capable of receiving the command (S51). Here, the DMAC being capable of receiving a command means that at least one processing circuit 18 capable of performing the data process which is not blocked is present in the DMAC.

When there is the DMAC 17 capable of receiving a command (Yes in S51), the DMAC selection unit 13 selects any one of the DMACs 17 capable of receiving a command, and transmits the DMA command and the processing target data. A condition for selecting the DMAC may be to select a DMAC that is found first and that can receive the command. If a DMAC with a low load is selected by checking a load status of the DMAC, processes can be distributed, which contributes to improving processing efficiency.

When there is no DMAC 17 capable of receiving a command (No in S51), for example, when the processing circuits 18 in all the DMACs 17 are in the command processing, the DMAC selection unit 13 continues monitoring until any one of the processing circuits 18 completes the processing and the DMAC 17 is found in which the column 122 of Busy of the DMAC management table 14 is set to OFF (0).

The DMA command and the processing target data in the selected DMAC 17 are received by the reception unit 42 and output to the IP selection unit 15. When the DMA command and the processing target data are received, the IP selection unit 15 refers to the column 135 of command receivable of the IP management table 16 and determines whether there is the processing circuit 18 capable of receiving a command among the processing circuits 18 as the selection targets (S52). The fact that there is the processing circuit 18 capable of receiving a command means that there is the processing circuit 18 capable of processing data that is neither in processing nor on standby of the cyclic correction nor being arbiter participation unavailable.

When there is the processing circuit 18 capable of receiving a command (Yes in S52), the IP selection unit 15 selects any one of the processing circuits 18 capable of receiving a command and transmits the command reception notification. In terms of the selection of the processing circuit 18, if a processing circuit with less occurrence of errors is selected based on information such as the error occurrence count, it is possible to reduce errors and perform a more efficient process.

When there is no processing circuit 18 capable of receiving a command (No in S52), the IP selection unit 15 continues monitoring until the processing circuit 18 is found in which the column 135 of command receivable of the IP management table 16 is Yes.

When the processing circuit 18 capable of receiving a command is selected, the IP selection unit 15 transfers the DMA command and the processing target data to the corresponding IP control unit 41. When the IP control unit 41 transmits the command to the selected processing circuit 18, the processing circuit 18 starts the command process (S53).

In the command process, the processing circuit 18 performs the DMA for accessing the address of the data storage region 11 in which data to be processed is stored. Specifically, the reception unit 42 receives the data read from the address, and the processing circuit 18 processes the data and notifies the transmission unit 43 of the completion of the processing. Upon receiving the completion notification from the processing circuit 18, the DMA is executed by transmitting the data processed by the transmission unit 43 to the main storage memory 3.

Figure 5:
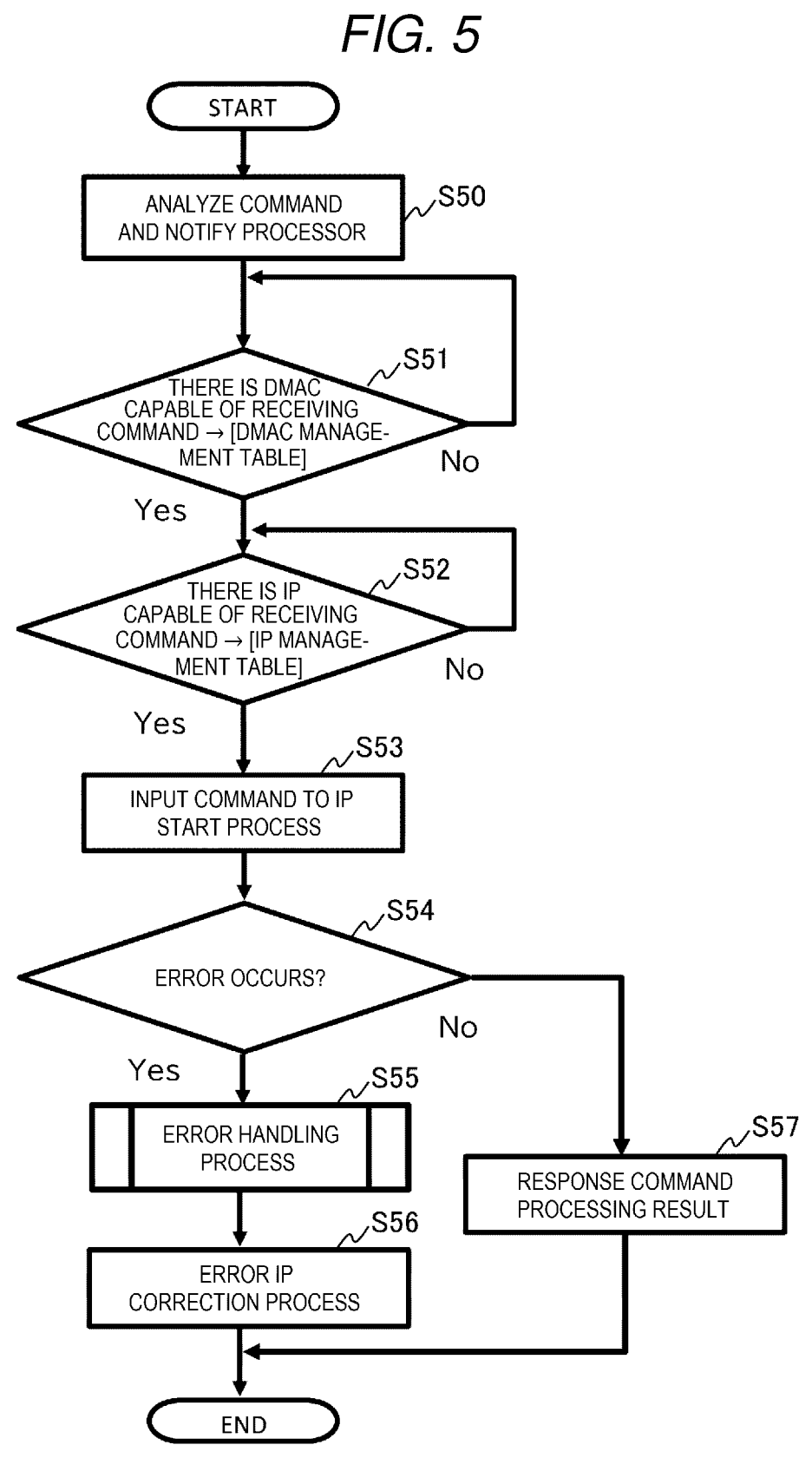

Returning to the description of FIG. 5, when the processing target data read from the data storage region 11 is received by the reception unit 42 and output to the selected processing circuit 18 via the IP selection unit 15, a data process based on the DMA command is executed. When the process is normally completed (No in S54), the processing circuit 18 transmits the DMA command including a processing result of the command to the command control unit 19 via the IP selection unit 15 and the DMAC selection unit 13, and transmits the processed data to the transmission unit 43.

The transmission unit 43 directly transmits and writes the processed data to the address of the data storage region 11 in which the processing target data is stored. The command control unit 19 transmits the processing result and the address of the command and execution result storage region 10 in which the DMA command is stored to the CPU 2 (S57).

The processing result is received by the processor processing unit 8 in the CPU 2, and the control unit 9 writes a response result to the address of the command and execution result storage region 10 in which the DMA command is stored. Further, the control unit 9 transmits the processing result to the host via the host IF 5.

When an error (including an error caused by the soft error) occurs during the command process performed by the processing circuit 18 (Yes in S54), the corresponding error detection circuit 45 detects the error and notifies the IP selection unit 15 of the error. The IP selection unit 15 that receives the error notification transmits the DMA command of the error including a number of the processing circuit in which the error occurs to the command control unit 19. The command control unit 19 transmits the DMA command of the error to the processor processing unit 8 of the CPU 2, and the control unit 9 of the CPU 2 executes an error handling process after receiving the DMA command (S55). Details of the error handling process will be described later with reference to FIG. 6.

The IP selection unit 15 sets the column 133 of cyclic correction on standby in the IP management table 16 corresponding to the processing circuit 18 in which the error occurs to ON (1), and sets the column 135 of command receivable to No.

The SEU detection and correction mechanism 28 periodically performs a cyclic correction check of the CRAM, and performs the error correction of the processing circuit 18 in which the error occurs in a cyclic correction period of an order of several hundred milliseconds (S56). When the correction of the error is completed, the IP selection unit 15 sets the column 133 of cyclic correction on standby in the IP management table 16 corresponding to the processing circuit 18 in which the error occurs to OFF (0), and sets the column 135 of command receivable to Yes if the corresponding column 132 of in processing and the corresponding column 134 of arbiter participation unavailable are also OFF (0).

The error detection circuit 45 may be capable of selecting the corresponding processing circuit 18 by resetting the column 134 of arbiter participation unavailable of the IP management table 16 in a predetermined period, for example, in the cyclic correction period. The processing circuit 18 that can be used for such processing can be effectively used.

Figure 6:
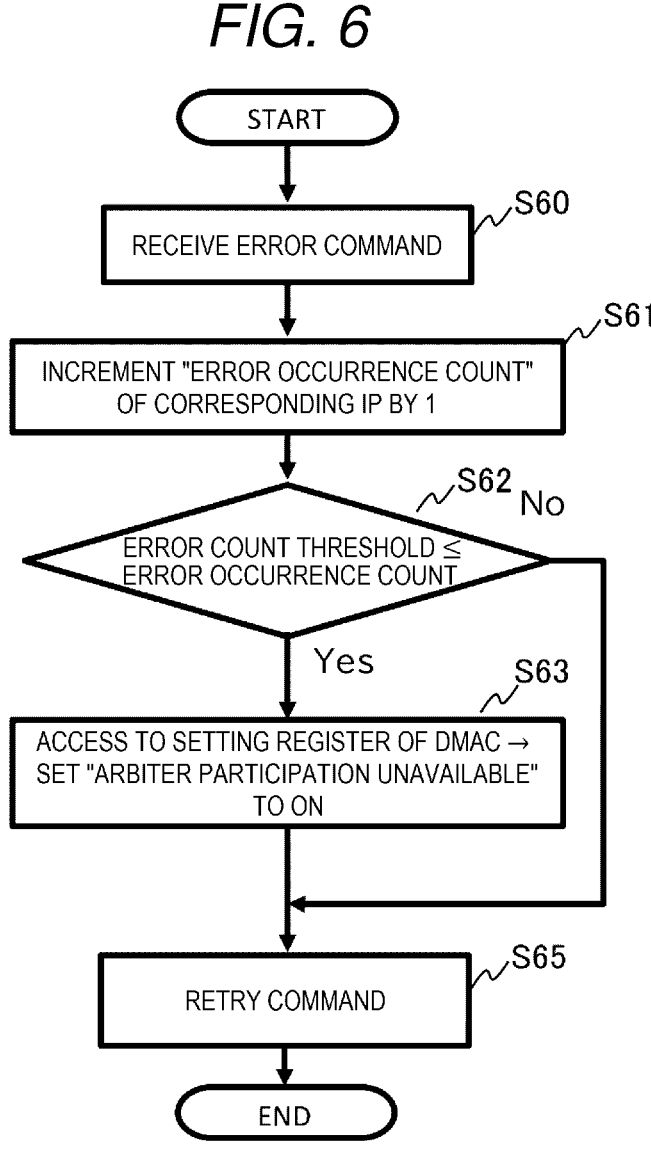
FIG. 6 shows an example of an error handling process according to the embodiment of the invention.

FIG. 6 shows an example of the error handling process S55 of the CPU 2. When the DMA command of the error is received from the IP selection unit 15 of the DMAC 17 in which the error occurs (S60), the control unit 9 increments the error occurrence count 113 of the processing circuit in the IP error count management table 12 (FIG. 9) by 1 (S61). It is determined whether the error occurrence count of the processing circuit is equal to or greater than the error count threshold of the IP error count management table 12 (S62). When the error occurrence count is equal to or greater than the error count threshold, a setting register 81 of the DMAC 17 to which an error command is transmitted is accessed, and a flag in the column 134 of arbiter participation unavailable in the IP management table 16 (FIG. 11) corresponding to the processing circuit 18 in which the error occurs is set to ON (S63). Thereafter, the processing circuit 18 is excluded from the selection targets of the IP selection unit 15 unless the column 134 of arbiter participation unavailable is reset to OFF (0).

Assignment of processing to the processing circuit 18 is executed by referring to the DMAC management table 14 and the IP management table 16. An entity of the DMAC management table 14 and the IP management table 16 is present on a register of the processor 4.

The processor processing unit 8 refers to the setting register 81 in the DMAC to retry the DMA command (S65). That is, the processor processing unit 8 retransmits the command reception notification including the address of the DMA command stored in the command and execution result storage region 10 to the processor 4, and thereafter, the command processing operations are performed again according to the flow described with reference to FIG. 5. Alternatively, the command control unit 19 of the processor 4 may transmit the DMA command of the error to the CPU 2, thereafter access the address of the command and execution result storage region 10 in which the DMA command is stored, and execute the DMA command again.

When the error occurrence count is not equal to or greater than the error count threshold in S62, the control unit 9 retries the command.

Figure 7:
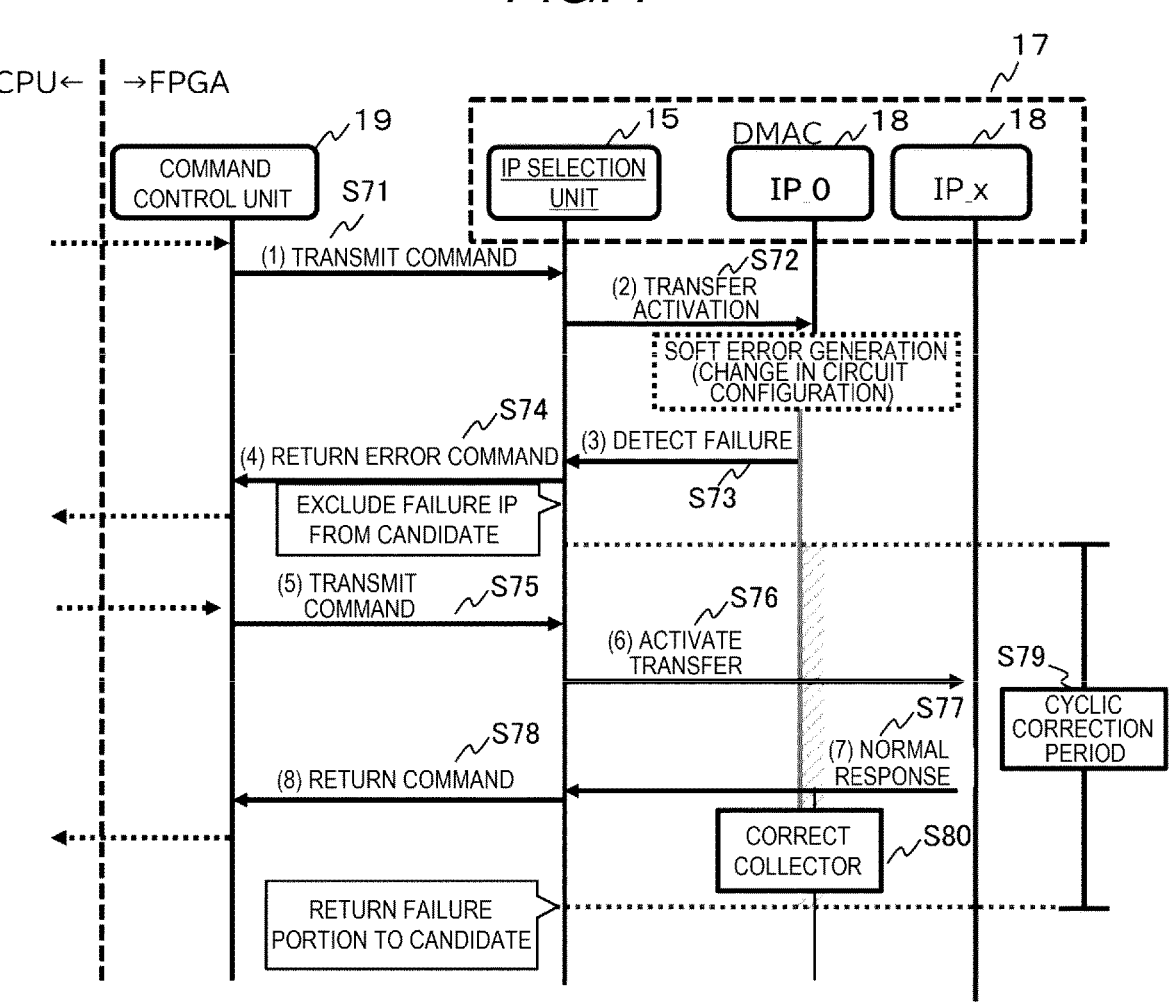
FIG. 7 shows an example of a sequence when a soft error occurs according to the embodiment of the invention.

FIG. 7 shows an example of a sequence when a soft error occurs according to the embodiment of the invention. In FIG. 7, the description assumes that there is only one DMAC 17 in the processor 4 or the DMAC 17 that processes the host command is already selected from the plurality of DMACs 17.

When the command reception notification including the address of the DMA command stored in the command and execution result storage region 10 is received from the processor processing unit 8 of the CPU 2, the command control unit 19 of the processor 4 reads the DMA command (hereinafter referred to as a command in FIGS. 7 and 8) and the processing target data from the main storage memory 3 based on the address, and transmits the DMA command and the processing target data to the DMAC selection unit 13 (S71).

In the DMAC 17, when the DMA command and the processing target data are received, the IP selection unit 15 selects the processing circuit 18 that performs the command process by referring to the IP management table 16, and transfers the DMA command and the processing target data to the selected processing circuit 18 (S72). In this example, IP_0 of the DMAC 17 is selected. When a soft error occurs in IP_0 and the circuit configuration changes, a corresponding error detection circuit (not shown) detects a failure and notifies the IP selection unit 15 of the error notification (S73). The IP selection unit 15 returns the DMA command (hereinafter, referred to as an error command in FIGS. 7 and 8) of the error including the number of the processing circuit in which the error occurs to the command control unit 19 (S74).

When the command control unit 19 receives the DMA command of the error, the command control unit 19 transmits the DMA command to the CPU 2 and makes the retry request of the DMA command. When the command reception notification is transmitted again from the processor processing unit 8 of the CPU 2 in response to the retry, the command control unit 19 transmits the DMA command and the processing target data that are read from the main storage memory 3 to the DMAC 17 again, and the IP selection unit 15 receives the DMA command and the processing target data (S75).

The IP selection unit 15 selects a processing circuit IP_x in which no error occurs and transfers the command (S76). When the IP_x correctly processes the command and completes the data processing of a request content, a data processing result is written to the data storage region 11 by the DMA, and the DMA command including the processing result as a normal response is returned to the IP selection unit 15 (S77). The IP selection unit 15 returns the DMA command to the command control unit 19 (S78). In the case of the IP_0 in which the error occurs during this period, the SEU detection and correction mechanism 28 corrects a collectable error in the cyclic correction period (S79) (S80). The IP selection unit 15 does not select the IP_0 for a certain period of time equal to or longer than the cyclic correction period, and adds the IP_0 to the selection targets after the certain period of time elapses.

Figure 8:
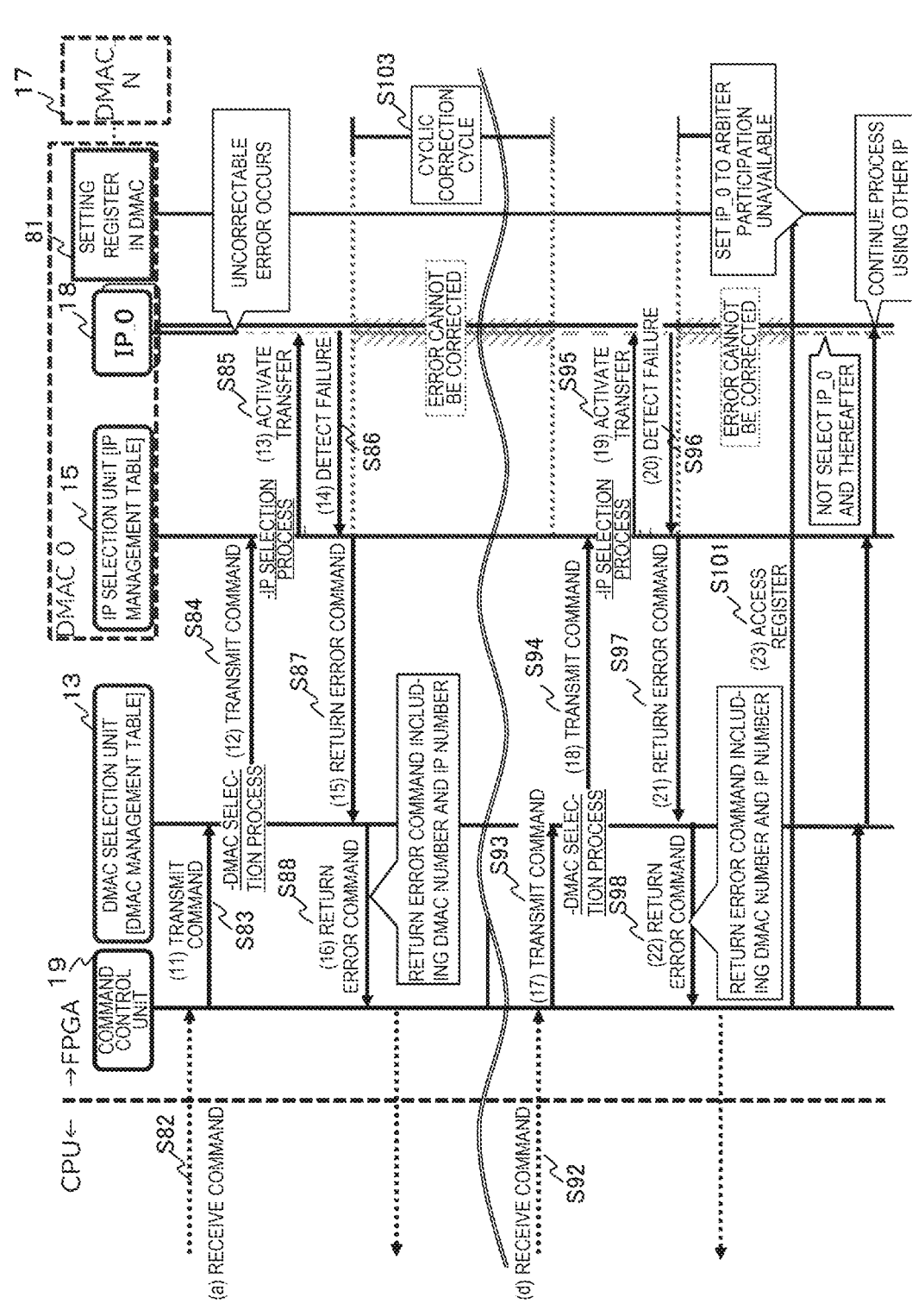
FIG. 8 shows an example of a processing sequence when an uncorrectable error occurs according to the embodiment of the invention.

FIG. 8 shows an example of a processing sequence when an uncorrectable error occurs according to the embodiment of the invention. This example shows a sequence in the case of a system including a plurality of DMACs, but the sequence is also applicable to a system with one DMAC.

When the command reception notification including the address of the DMA command stored in the command and execution result storage region 10 is received from the processor processing unit 8 of the CPU 2 (S82), the command control unit 19 of the processor 4 reads the DMA command and the processing target data from the main storage memory 3 based on the address, and transmits the DMA command and the processing target data to the DMAC selection unit 13 (S83). The DMAC selection unit 13 selects a DMAC_0 as the DMAC 17 that performs the command process by referring to the DMAC management table 14 and transmits the DMA command and the processing target data (S84).

A series of operations (S85 to S88) in which the IP selection unit 15 in the DMAC_0 that receives the DMA command and the processing target data selects the processing circuit IP_0, executes the command process, receives a notification of the failure detection based on the soft error, and transmits the error command are the same as those in FIG. 7, and thus detailed description thereof will be omitted. The DMA command of the error transmitted by the IP selection unit 15 includes the number of the selected DMAC_0 in addition to the number of the processing circuit IP_0 in which the error occurs.

When the command control unit 19 receives the command reception notification again from the processor processing unit 8 of the CPU 2 based on the command retry request (S92), the command control unit 19 reads the DMA command and the processing target data from the main storage memory 3 and retransmits the DMA command and the processing target data to the DMAC selection unit 13 of the processor 4 (S93). When the DMAC selection unit 13 selects the DMAC_0 again, the DMA command and the processing target data are transmitted to the IP selection unit 15 (S94). Since the processing circuit IP_0 is recognized as the selection target if the error correction is performed, when the IP selection unit 15 selects the processing circuit IP_0 again, the command process is executed (S95).

When the error correction of the processing circuit IP_0 fails, that is, when the error is an uncorrectable error, the DMA command of the error is returned again via the IP selection unit 15 and the DMAC selection unit 13 ((S96) to (S98)).

When the DMA command of the error is received, the control unit 9 of the CPU 2 increments the occurrence count value of the processing circuit IP_0 in the column 113 of the error occurrence count corresponding to the DMAC_0 and the processing circuit IP_0 in the IP error count management table 12, and compares the occurrence count with the corresponding error count threshold 115. When the occurrence count is equal to or larger than the threshold, the column 134 of arbiter participation unavailable of the processing circuit IP_0 in the IP management table 16 stored in the DMAC internal setting register 81 of the DMAC_0 is set to 1 (ON), and the column 135 of command receivable is set to No (S101). Thereafter, the IP selection unit 15 recognizes that the processing circuit IP_0 cannot receive the command, and does not select the processing circuit IP_0 as the selection target.

According to the sequence example described above, the processing circuit IP_0 in which a soft error that cannot be repaired in the correction process occurs is permanently excluded from the selection targets when a predetermined count of the error commands are generated. Therefore, the command process is continued by another processing circuit capable of receiving a command, and an infinite command retry loop caused by selecting the processing circuit IP_0 can be prevented.

By controlling the arbiter participation of the processing circuit 18 using the DMAC internal setting register 81, it becomes easier to determine an arbiter participation condition using the information registered in the IP error count management table 12 as a condition that meets needs of a system that performs a soft error process.

Although it is not necessary to perform blocking when the error correction fails once, the blocking may be performed when the error correction fails for a predetermined count. Further, since the processing circuit 18 blocked once is also operated again, the processing circuit 18 can be used again in a predetermined period. A condition for blocking the processing circuit 18 and a condition for reusing the processing circuit 18 can be appropriately adjusted according to a system to be applied.

According to the embodiment described above, the processor 4 of the FPGA includes one or a plurality of DMACs 17, and each DMAC 17 includes a plurality of processing circuits 18 that process a command from the host IF 5 and the IP selection unit 15 that selects the processing circuit 18 capable of executing the command upon receiving the command. When a soft error occurs in the processing circuit 18 that is executing the command and the circuit configuration is changed, the error of the processing circuit 18 is notified to the IP selection unit 15, and the IP selection unit 15 receives the notification, excludes the processing circuit 18 from the selection targets, and can select another processing circuit 18 capable of executing the command. Therefore, even if a soft error occurs in a processing circuit that is executing a command, the command execution can be continued in another processing circuit capable of executing the command, and an influence of malfunction of the FPGA due to the occurrence of the soft error can be reduced.

Since each processing circuit 18 is a processing system that normally operates and can execute a command by a parallel process, a use efficiency of circuit resources of the FPGA is increased as compared with a case where an inactive standby circuit is provided. Further, when N processing circuits are mounted on the DMAC 17, system down can be avoided until errors occur in N−1 processing circuits.

The SEU detection and correction mechanism 28 performs the error correction process on the processing circuit 18 in which the error occurs in the cyclic correction period, and performs a repair of the circuit configuration. The processing circuit 18 is set to be selectable from the IP selection unit 15 again after the period elapses, so that redundancy of the processing circuit 18 is quickly recovered, and the influence of the malfunction of the FPGA due to the occurrence of the soft error can be further reduced.

The control unit 19 of the CPU 2 counts and monitors the error occurrence count in each processing circuit 18 by receiving the error command from the processing circuit 18 in which the error occurs, determines that the processing circuit in which a predetermined count or more of the error occurrence is detected is blocked, and sets the processing circuit in a manner of not being selected from the IP selection unit 15 in the same DMAC 17. For this reason, it is possible to avoid an infinite loop of the command retry caused by the processing circuit being set to be selectable after the execution of the error correction for the processing circuit in which the uncorrectable error that cannot be corrected in the error correction occurs, and it is possible to improve the availability when the uncorrectable error occurs.

What is claimed is:

1. A data processing system comprising:
a processor implemented by a programmable device; and
a processor processing unit connected to the processor, wherein
the processor includes
    a plurality of processing circuits configured to execute in parallel data processing commands provided from the processor processing unit,
    an error detection circuit configured to detect a soft error occurring in a processing circuit that is executing the data processing command, and
    a processing circuit selection unit configured to select a processing circuit to execute the data processing command from the plurality of processing circuits,
the processing circuit selection unit specifies a processing circuit in which the soft error occurs based on a soft error detection result of the error detection circuit, and selects a processing circuit to execute the data processing command from the plurality of processing circuits, excluding the processing circuit in which the soft error occurs,
the error detection circuit is configured to detect the soft error and correct the detected soft error for the plurality of processing circuits in a specific period, and
after the period elapses from the specification of the processing circuit in which the soft error occurs, the processing circuit selection unit selects the processing circuit as a processing circuit that executes the data processing command.

2. The data processing system according to claim 1, wherein when a soft error occurs in a specific processing circuit a predetermined count or more, the processing circuit selection unit does not select the processing circuit as a processing circuit that executes the data processing command.

3. A data processing system comprising:

a processor implemented by a programmable device; and a processor processing unit connected to the processor, wherein the processor includes a plurality of processing circuits configured to execute in parallel data processing commands provided from the processor processing unit, an error detection and correction circuit configured to detect a soft error occurring in a processing circuit that is executing the data processing command, and a processing circuit selection unit configured to select a processing circuit to execute the data processing command from the plurality of processing circuits, the processing circuit selection unit specifies a processing circuit in which the soft error occurs based on a soft error detection result of the error detection circuit, and selects a processing circuit to execute the data processing command from the plurality of processing circuits, excluding the processing circuit in which the soft error occurs in the processor, the plurality of processing circuits are classified into a plurality of processing circuit groups, and the processing circuit selection unit is provided corresponding to the processing circuit groups.

4. The data processing system according to claim 3, wherein the processor includes a processing circuit group selection unit configured to select the processing circuit group to execute the data processing command from the plurality of processing circuit groups, and the processing circuit group selection unit selects the processing circuit group to execute the data processing command based on an execution state of the data processing command of the processing circuit belonging to the processing circuit groups.

5. A data processing method performed by a data processing system including a processor implemented by a programmable device, and a processor processing unit connected to the processor, wherein the processor includes a plurality of processing circuits configured to execute in parallel data processing commands provided from the processor processing unit, an error detection circuit configured to detect a soft error occurring in a processing circuit that is executing the data processing command, and a processing circuit selection unit configured to select a processing circuit to execute the data processing command from the plurality of processing circuits, the error detection circuit detects the occurrence of the soft error in the processing circuit that is executing the data processing command, and the method comprising the steps of:

specifying, by the processing circuit selection unit, a processing circuit in which the soft error occurs based on a soft error detection result of the error detection circuit, and selecting a processing circuit to execute the data processing command from the plurality of processing circuits, excluding the processing circuit in which the soft error occurs, detecting the soft error and correcting the detected soft error for the plurality of processing circuits in a specific period, and after the period elapses from the specification of the processing circuit in which the soft error occurs, the processing circuit selection unit selects the processing circuit as a processing circuit that executes the data processing command.

* * * * *